US006726334B2

(12) United States Patent
Ishino

(10) Patent No.: US 6,726,334 B2
(45) Date of Patent: Apr. 27, 2004

(54) LIGHTING DEVICE AND PROJECTION TYPE IMAGE DISPLAY DEVICE

(75) Inventor: Hirohisa Ishino, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/343,883
(22) PCT Filed: Jun. 10, 2002
(86) PCT No.: PCT/JP02/05745
§ 371 (c)(1),
(2), (4) Date: Feb. 5, 2003
(87) PCT Pub. No.: WO02/101417
PCT Pub. Date: Dec. 19, 2002

(65) Prior Publication Data
US 2003/0189693 A1 Oct. 9, 2003

(30) Foreign Application Priority Data
Jun. 8, 2001 (JP) ........................................ 2001-174719

(51) Int. Cl.[7] ........................ G03B 21/14; G03B 21/00; G02B 5/22
(52) U.S. Cl. .............................. 353/84; 353/31; 353/38; 359/891
(58) Field of Search ............................. 353/30–34, 84, 353/122, 100, 38; 349/5, 7, 8; 359/891

(56) References Cited

U.S. PATENT DOCUMENTS

| 3,754,135 | A | * | 8/1973 | Hulbert, Jr. ................. 362/293 |
| 5,251,068 | A | * | 10/1993 | Oshima et al. .............. 359/634 |
| 2003/0058412 | A1 | * | 3/2003 | Owen et al. ................. 353/31 |
| 2003/0174293 | A1 | * | 9/2003 | Hubel et al. ................. 353/84 |

FOREIGN PATENT DOCUMENTS

| JP | 7-318922 | 12/1995 |
| JP | 8-129177 | 5/1996 |
| JP | 9-236797 | 9/1997 |
| JP | 10-509532 | 9/1998 |
| JP | 11-249098 | 9/1999 |
| JP | 2002-71934 | 3/2002 |

OTHER PUBLICATIONS

JP 08–129177 Deguchi et al., Display Device, May, 21, 1996. Translation: Dec. 3, 2003 by Japan Patent Office Home page: Industrial Property Digital Libray Patent & Utility Model Gazette DB, Application No. 06–269354, Applicant: Hitachi LTD.*

* cited by examiner

Primary Examiner—Russell Adams
Assistant Examiner—Andrew Sever
(74) Attorney, Agent, or Firm—Frommer Lawrence & Haug LLP; William S. Frommer

(57) ABSTRACT

There is provided an illuminator to emit trichromatic light. It includes a lamp (1) which emits trichromatic light including components whose wavelengths correspond to three primary colors, respectively, and a wavelength-selective optical aperture filter (22) provided at the side of the lamp (1) from which the light of three primary colors go out and consisting of zones working as predetermined optical apertures of which one selectively attenuates or shields a component included in the trichromatic light and having a wavelength corresponding to at least one of the three primary colors while the others allow the light components whose wavelengths correspond to the other primary colors to pass through.

25 Claims, 8 Drawing Sheets

LIGHTING DEVICE AND PROJECTION TYPE IMAGE DISPLAY DEVICE

TECHNICAL FIELD

The present invention relates to an illuminator which emits trichromatic light including components whose wavelengths correspond to three primary colors: red, green and blue, respectively, and a projector type image display apparatus which projects the trichromatic light emitted from the illuminator to display a color image.

BACKGROUND ART

Heretofore, there have been proposed projector type image display apparatuses in which white light is separated by color separation mirrors (dichroic mirror) into components of three primary colors: red (R), green (G) and blue (B) and these R, G and B light components are incident upon three image display panels, such as liquid crystal display (LCD) panel, respectively, the light components having passed through the image display panels are combined to produce synthetic light, and the synthetic light is projected onto a screen.

In the above projector type image display apparatuses, it is possible to adjust the white chromaticity or white balance of the projected light by adjusting the ratio in amount among the primary-color light components. One of the methods of adjusting the ratio in amount among the primary-color light components is to vary the electrically driven level of the display device for each primary-color channel from one channel to another.

However, this method is not advantageous in that it is necessary to lower the electrically driven level of the display device for a channel to be attenuated and the contrast of the channel for which the driven level has been lowered will be lower.

To prevent the contrast from being lower, it has been proposed to provide a transmissive filter such as ND (neutral density) filter in the optical path of a channel to be attenuated. In this case, the contrast can be made higher than by the above-mentioned electrical adjustment since it is unnecessary to lower the electrically driven level of the display device for any channel not to be attenuated.

However, the above method needs as many optical attenuation means such as ND filters as the channels to be attenuated, which will result in a complicated construction of the apparatus, that is, in a larger number of parts and number of manufacturing steps. Also, it is not expectable that an image can be displayed with any higher contrast than that which can be assured when the electrically driven level of the liquid crystal panels is not lowered.

Therefore, there have not yet been implemented any illuminator and projector type image display apparatus, simply constructed and capable of adjusting the white chromaticity of a projected light and displaying an image with an improved contrast.

DISCLOSURE OF THE INVENTION

Accordingly, the present invention has an object to overcome the above-mentioned drawbacks of the related art by providing an illuminator and projector type image display apparatus, simply constructed and capable of adjusting the white chromaticity of a projected light and displaying an image with an improved contrast.

The above object can be attained by providing an illuminator which emits trichromatic light including components whose wavelengths correspond to three primary colors, respectively, the apparatus including according to the present invention:

a light source to emit the trichromatic light; and a wavelength-selective optical aperture filter formed from a plurality of lens elements, being provided at the side of the light source from which the trichromatic light goes out, and which consists of zones working as predetermined optical apertures, of which one selectively attenuates or shields a component of the trichromatic light, whose wavelength corresponds to at least one of the three primary colors, while the other zones allow the light components whose wavelengths correspond to the other primary colors to pass through.

The illuminator constructed as above uses the wavelength-selective optical aperture filter formed from a spectral filter such as a dichroic filter designed to have an optical aperture variable correspondingly to a wavelength of illumination light, and can thus limit a component of the illumination light, whose wavelength corresponds to a specific primary color, and freely adjust the intensity of that primary-color light.

Also the above object can be attained by providing an illuminator which emits trichromatic light including components whose wavelengths correspond to three primary colors, respectively, the apparatus including according to the present invention:

a light source to emit the trichromatic light;

a pair of fly-eye lenses each formed from a plurality of lens elements and which separates the trichromatic light emitted from the light source into primary-color light components and allows the separated primary-color light components to pass through the plurality of lens elements, thereby uniformizing the trichromatic light output; and a wavelength-selective optical aperture filter provided adjacent to one of the fly-eye lenses that is farther from the light source and which consists of zones working as predetermined apertures, of which one selectively attenuates or shields a component of the trichromatic light, whose wavelength corresponds to at least one of the three primary colors, while the other zones allow the light components whose wavelengths correspond to the other primary colors to pass through.

The illuminator constructed as above uses the wavelength-selective optical aperture filter formed from a spectral filter such as a dichroic filter designed to have an optical aperture variable correspondingly to a wavelength of illumination light, and can thus limit a component of the illumination light, whose wavelength corresponds to a specific primary color, and freely adjust the intensity of that primary-color light.

Also the above object can be attained by providing a projector type image display apparatus including according to the present invention:

an illuminator including:

a light source to emit trichromatic light; and a wavelength-selective optical aperture filter provided at the side of the light source from which the trichromatic light goes out and which consists of zones working as predetermined apertures, of which one selectively attenuates or shields a component of the trichromatic light, whose wavelength corresponds to at least one of the three primary colors, while the other zones allow the light components whose wavelengths correspond to the other primary colors to pass through; and a color separation means for separating the trichromatic light output from the wavelength-selective optical aperture filter into components whose wavelengths correspond to the three primary colors, respectively;

three image display panels to modulate, according to a video signal, the light components separated by the color separation means and whose wavelengths correspond to the three primary colors, respectively;

a color synthesis means for combining together the light components modulated by the three image display panels and whose wavelengths correspond to the three primary colors, respectively, to produce synthetic light; and a projection lens to project the synthetic light from the color synthesis means onto a screen.

In the projector type image display apparatus constructed as above, the illuminator uses the wavelength-selective optical aperture filter formed from a spectral filter such as a dichroic filter designed to have an optical aperture variable correspondingly to a wavelength of illumination light, and thus can limit a component of the illumination light, whose wavelength corresponds to a specific primary color, and freely adjust the intensity of that light.

Also the above object can be attained by providing a projector type image display apparatus including according to the present invention:

an illuminator including:

a light source to emit trichromatic light;

a pair of fly-eye lenses each formed from a plurality of lens elements and which separates the trichromatic light emitted from the light source into primary-color light components and allows the separated primary-color light components to pass through the plurality of lens elements, thereby uniformizing the trichromatic light output; and a wavelength-selective optical aperture filter provided adjacent to one of the fly-eye lenses that is farther from the light source and which consists of zones working as predetermined apertures, of which one selectively attenuates or shields a component of the trichromatic light, whose wavelength corresponds to at least one of the three primary colors, while the other zones allow the light components whose wavelengths correspond to the other primary colors to pass through; and means for splitting the trichromatic light output from the wavelength-selective optical aperture filter into components whose wavelengths correspond to the three primary colors, respectively;

three image display panels to modulate, according to a video signal, the light components separated by the color separation means and whose wavelengths correspond to the three primary colors, respectively;

a color synthesis means for combining together the light components modulated by the three image display panels and whose wavelengths correspond to the three primary colors, respectively, to produce synthetic light; and a projection lens to project the synthetic light from the color synthesis means onto a screen.

In the projector type image display apparatus constructed as above, the illuminator uses the wavelength-selective optical aperture filter formed from a spectral filter such as a dichroic filter designed to have an optical aperture variable correspondingly to a wavelength of illumination light, and thus can limit a component of the illumination light whose wavelength corresponds to a specific primary color, and freely adjust the intensity of that primary-color light.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIG. 4 shows the relation between the wavelength and transmittance of a wavelength-selective optical aperture filter which allows the rays of light of all primary colors to pass through.

FIG. 5 shows the relation between the wavelength and transmittance of a wavelength-selective optical aperture filter which allows only the red light to pass through.

BEST MODE FOR CARRYING OUT THE INVENTION

The embodiments of the present invention will be described below with reference to the accompanying drawings.

Figure 1:
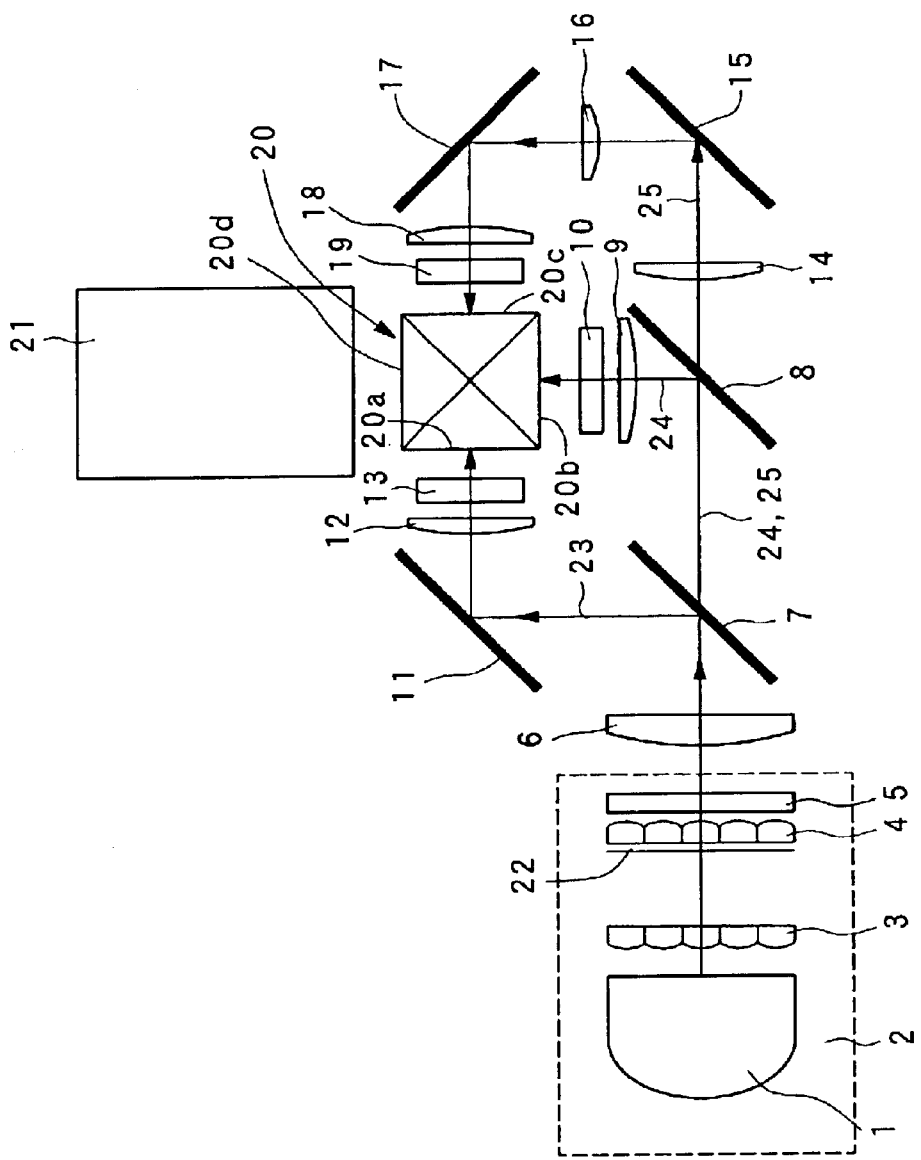
FIG. 1 shows an example construction of the optical system of the liquid crystal projector according to the present invention.

Referring now to FIG. 1, there is illustrated the projector type image display according to the present invention. The projector type image display apparatus will be referred to as "liquid crystal projector" hereunder. As shown, the liquid crystal projector includes an illuminator 2 which emits illumination light including components having three primary colors, respectively, and an optical system which includes a main condenser lens 6, dichroic mirrors 7 and 8, mirrors 11, 15 and 17, channel condenser lenses 9, 12 and 18, relay lenses 14 and 16, cross prism 20 and a projection lens 21 and separates the illumination light emitted from the illuminator 2 into the light components having three primary colors: green (G), blue (B) and red (R), respectively, and guide them to the liquid crystal panels 10, 13 and 19.

The optical system including the illuminator 2, liquid crystal panels 10, 13 and 19, main condenser lens 6, etc. is provided in an enclosure.

The illuminator 2 includes a lamp 1 to emit trichromatic light, a pair of fly-eye lenses 3 and 4 to uniformize the illumination distribution of the light components having three primary colors, a PS converter 5 to equalize polarized ones of the red, green and blue light components, and a wavelength-selective optical aperture filter 22.

The lamp 1 emits an illumination light including components having three primary colors: R, G and B, respectively, required for display of a color image. The lamp 1 includes a light emitter, which is not shown in the figure, to emit illumination light including components having three primary colors, respectively, and a reflector, which is not shown in the figure, to reflect and gather the light components emitted from the light emitter. The light emitter is an ultra-high voltage mercury lamp, halogen lamp, metal halide lamp or a xenon lamp, for example. The reflector should preferably be shaped for an improved efficiency of light condensation. For example, it should have a rotation-symmetrical surface like a revolution-paraboloidal mirror or the like.

Figure 2:
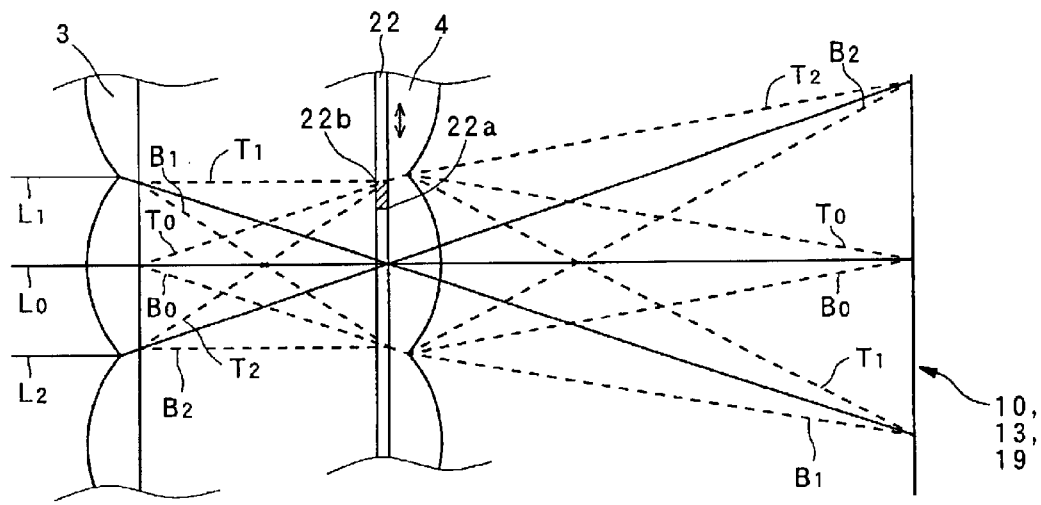
FIG. 2 explains the fly-eye lenses and wavelength-selective optical aperture filter.

The fly-eye lenses 3 and 4 illuminates the effective area, namely, display area, of each of the liquid crystal panels 10, 13 and 19 by equalizing the illumination distribution of the light components emitted from the lamp 1 as shown in FIG. 2. The fly-eye lens is also called "micro lens array". Specifically, the fly-eye lens is a matrix combination of a plurality of convex lenses being small lens elements. The effective areas of the liquid crystal panels 10, 13 and 19 are uniformly illuminated with the illumination light emitted from the lamp 1 and passed through each lens element of the fly-eye lens 3 positioned at the side of the lamp 1 and also through a corresponding lens element of the fly-eye lens 4. Therefore, even if the light going out from the lamp 1 has a constant illumination distribution but the light components passing through the lens elements of the fly-eye lens 3 are different in intensity from each other, the illumination distribution of the light components combined through the lens elements of the fly-eye lens 4 can be uniformized. Also in this embodiment, each of the fly-eye lenses 3 and 4 is flat at one of the main sides thereof and convex at the other main side having the lens elements, and they are positioned so that the flat surfaces of the lenses 3 and 4 are opposite to each other.

The PS converter 5 equalizes the polarized components of the illumination light for effective utilization of the illumination light emitted from the lamp 1. The PS converter 5 includes a $\lambda/2$ plate, polarizing beam splitter (PBS), etc. The PS converter 5 converts a P-polarized light into an S-polarized light for example while allowing the S-polarized light of the incident illumination light to pass through. Thus it can convert all the components of the illumination light into S-polarized light components. In an illuminator for use with liquid crystal panels upon which such polarized light is incident, the PS converter 5 is provided to improve the brightness by equalizing the polarized components of the light illuminating the liquid crystal panels.

The wavelength-selective optical aperture filter 22 is a spectral filter such as a dichroic filter designed so that each of the zones thereof variable in transmittance depending upon the wavelength of illumination light will work as an optical aperture. As the diameter of the optical aperture varies depending upon the wavelength of illumination light, the wavelength-selective optical aperture filter 22 changes the F value which is a brightness index of the illumination light, for thereby adjusting the wavelength by intensity attenuation as desired. The wavelength-selective optical aperture filter 22 is provided at the flat-surface side of the fly-eye lens 4 corresponding to the pupil's position of the illumination optical system. It has zones different in transmittance from each other correspondingly to the waveforms of components of the illumination light along the profile of the lens elements of the fly-eye lens 4. The "F value" referred to herein is a value inversely proportional to the aperture diameter, namely, to the brightness of the illumination light.

The main condenser lens 6 is a convex lens to gather the illumination light passed through the PS converter 5. It works with the channel condenser lense 9, 12 and 18 to gather and direct the light components having primary colors, respectively, upon the liquid crystal panels 10, 13 and 19.

The dichroic mirror 7 is provided to split the illumination light coming through the fly-eye lens 3, wavelength-selective optical aperture filter 22, fly-eye lens 4, PS converter and main condenser lens 6 into blue light 23 having a wavelength corresponding to the blue among the three primary colors and light components having wavelengths corresponding to other primary colors.

This liquid crystal projector has provided therein the mirror 11, channel condenser lens 12 and the liquid crystal panel 13 in this order along the optical path of the blue light 23 split by the dichroic mirror 7 from the illumination light.

The mirror 11 reflects the blue light 23 split by the dichroic mirror 7 from the illumination light toward the liquid crystal panel 13.

The channel condenser lens 12 gathers and directs the blue light 23 reflected from the mirror 11 upon the liquid crystal panel 13.

The liquid crystal panel 13 spatially modulates the blue light 23 incident thereupon through the mirror 11 and channel condenser lens 12 according to a video signal corresponding to the blue.

The liquid crystal projector has the dichroic mirror 8 provided along the optical path of the light components having the wavelengths corresponding to the other primary colors and split by the dichroic mirror 7 from the illumination light.

The dichroic mirror 8 splits the incident light components having the wavelengths corresponding to the other primary colors into a green light 24 having the wavelength corresponding to the green and a red light 25 having the wavelength corresponding to the red.

The liquid crystal projector has provided therein the channel condenser lens 9 and liquid crystal panel 10 in this order along the optical path of the green light 24 split by the dichroic mirror 8 from the illumination light.

The channel condenser lens 9 gathers and directs the green light 24 split by the dichroic mirror 8 from the illumination light upon the liquid crystal panel 10.

The liquid crystal panel 10 spatially modulates the green light 24 incident thereupon through the channel condenser lens 9 according to a video signal corresponding to green. The green light thus spatially modulated passes through the liquid crystal panel 10.

The liquid crystal projector has provided therein the relay lens 14, mirror 15, relay lens 16, mirror 17, channel condenser lens 18 and liquid crystal panel 19 in this order along the optical path of the red light 25 split by the dichroic mirror 8 from the illumination light.

The mirror 15 reflects, toward the mirror 17 through the relay lens 16, the red light 25 split by the dichroic mirror 8 from the illumination light and having come through the relay lens 14.

The mirror 17 reflects the red light 25 having come through the relay lens 16 toward the liquid crystal panel 19. The liquid crystal panel 19 will spatially modulate the red light 25 reflected from the mirror 17 and incident thereupon through the channel condenser lens 18 according to a video signal corresponding to the red.

The relay lenses 14 and 16 provided along the optical path of the red light 25 virtually equalize the optical path lengths of the blue and green light components 23 and 24 from the lamp 1 to that of the red light 25 which is longer.

Also, the liquid crystal projector has the cross prism 20 and projection lens 21 provided therein in a position where the optical paths of the blue, green and red light components 23, 24 and 25 cross each other. The cross prism 20 combines the blue, green and red light components 23, 24 and 25 together and the projection lens 21 projects the combined light components coming from the cross prism 20 toward a screen (not shown).

The cross prism 20 includes an incident face 20a upon which the blue light 23 is incident through the liquid crystal panel 13, an incident face 20b upon which the green light 24 is incident through the liquid crystal panel 10, an incident face 20c upon which the red light 25 is incident through the liquid crystal panel 19, and an outgoing face 20d opposite to the projection lens 21. The cross prism 20 combines together the primary-color light components incident upon the incident faces 20a, 20b and 20c and allow the combined light components to go out from the outgoing face 20d.

Figure 3:
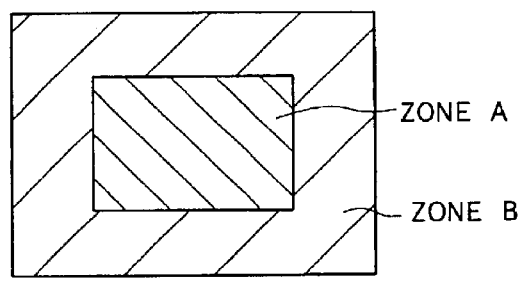
FIG. 3 is a plan view, from the lamp, of the wavelength-selective optical aperture filter in FIG. 1.

The wavelength-selective optical aperture filter 22 will be described in further detail herebelow. FIG. 3 is a plan view of the filter 22 from the lamp 1, namely, from the optical axis of the filter 22.

As shown in FIG. 3, the wavelength-selective optical aperture filter 22 has zones A and B. The zone A is defined in the center of the filter 22 while the zone B is positioned to surround the zone A. The zones A and B are different in selectivity of the wavelength of the dichroic filter from each other.

Figure 4:
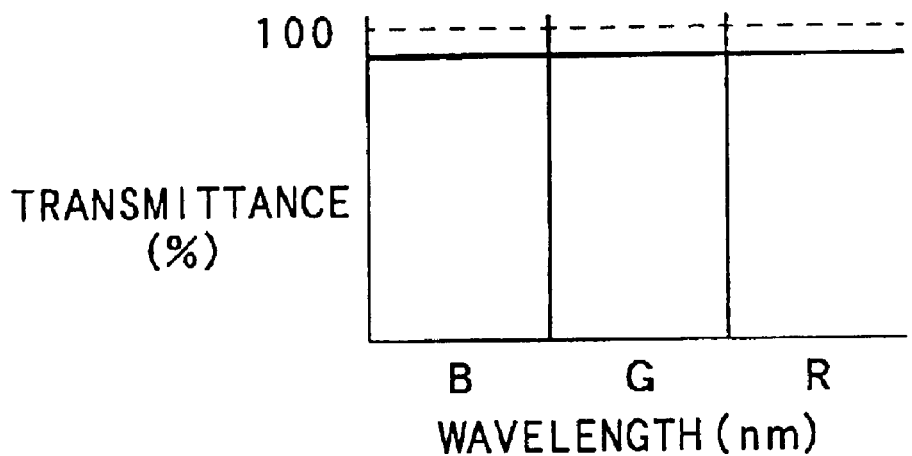
Figure 5:
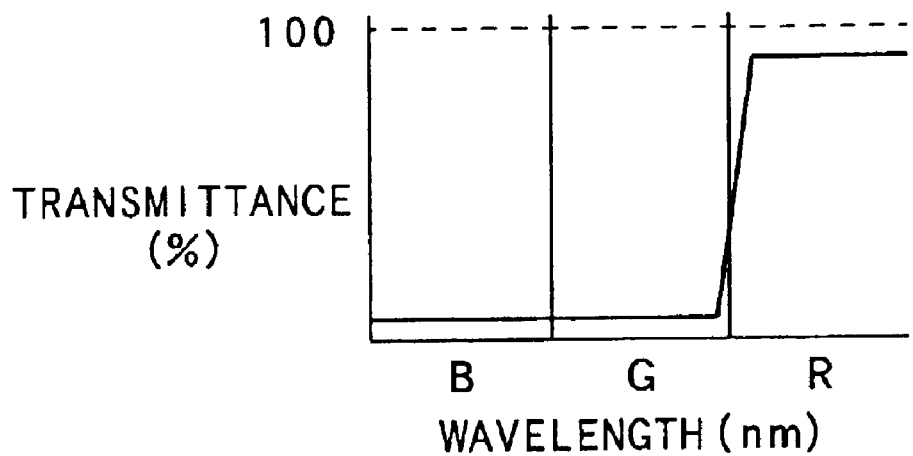

The wavelength-selective optical aperture filter 22 will functionally be described concerning a case in which the lamp 1 is a metal halide lamp or ultra-high voltage mercury lamp and the zone A of the filter 22 is characterized to allow all the blue, green and red light components 23, 24 and 25 to pass through as shown in FIG. 4 and the zone B is characterized to allow only the red light to pass through as shown in FIG. 5. It should be noted that the metal halide lamp and ultra-high voltage mercury lamp can emit trichromatic light including generally rather greenish and bluish light components having the wavelengths corresponding to the green and blue in larger amounts than the light having the wavelength corresponding to the red.

Figure 6:
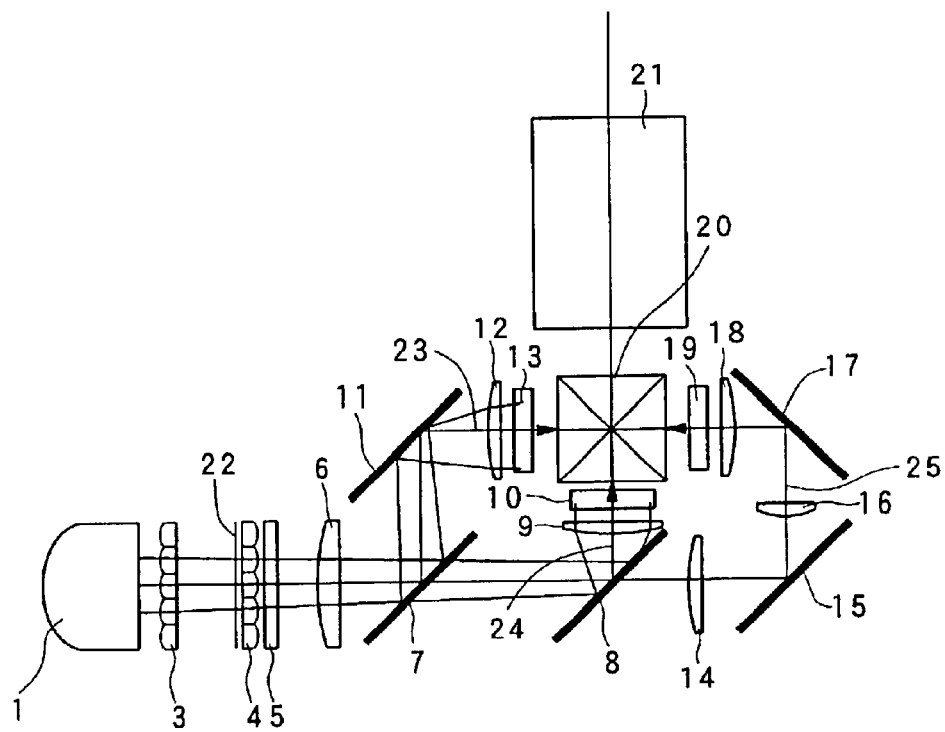
FIG. 6 shows the liquid crystal projector set to pass the blue and green rays of light only through the zone A and thus attenuate the intensity of the rays of light.
Figure 7:
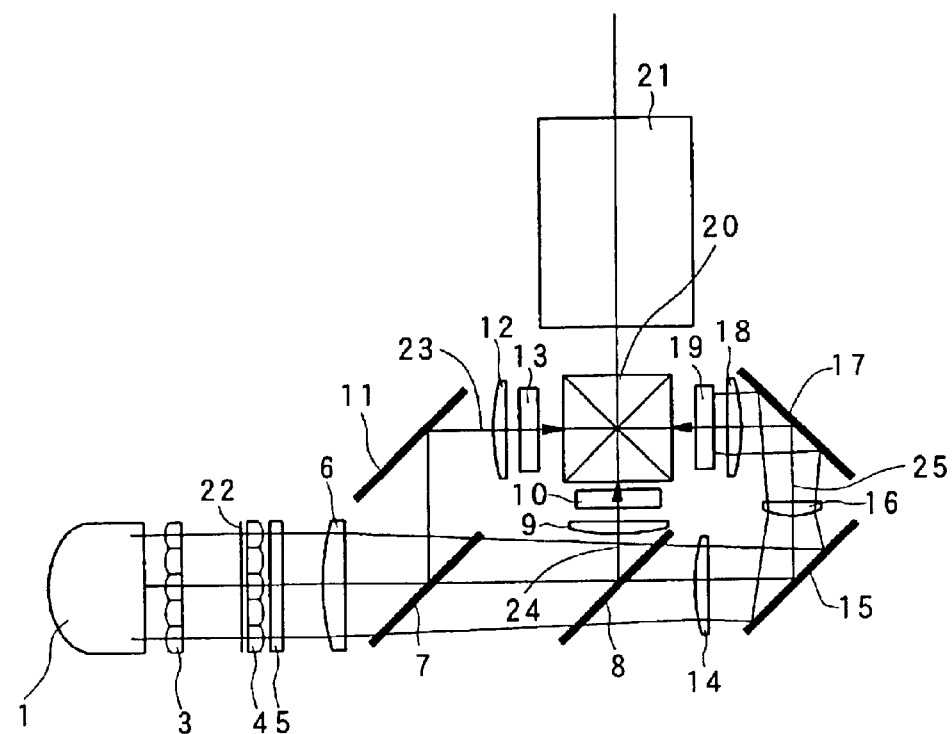
FIG. 7 shows the optical path for the red light.

In case the wavelength-selective optical aperture filter 22 having the above-mentioned characteristics, the red light 25 will pass through all the zones, that is, through the zones A and B in FIG. 3 while the blue and green light components 23 and 24 can only pass through the zone A shown in FIG. 3. Therefore, the zone through which the blue and green components of the illumination light emitted from the lamp 1 as shown in FIG. 6 are allowed to pass is substantially limited by the wavelength-selective optical aperture filter 22 to the zone A alone. That is, since the diameter of the optical aperture is limited, the F value of the illumination light is larger than that of the red light. Thus, the blue and green light components are diverged through a reduced angle, resulting in an intensity attenuation of the blue and green components. Since the red light can pass through all the zones A and B as shown in FIG. 7, it will be as bright as that which will be when the wavelength-selective optical aperture filter 22 is not provided in the optical path.

Therefore, since the wavelength-selective optical aperture filter 22 attenuates the intensity of the blue and green components when a metal halide lamp or ultra-high voltage mercury lamp is used as the lamp 1, it can adjust the white balance.

Next, the advantages of the wavelength-selective optical aperture filter 22 provided near the fly-eye lens 4 at the pupil of the illumination optical system will be described herebelow with reference to FIG. 2. It should be noted that in FIG. 2, there is omitted the optical system extending from the fly-eye lens 4 to the liquid crystal panels 10, 13 and 19.

Even if the wavelength-selective optical aperture filter 22 is not aligned at a zone boundary 22a thereof with the center of the lens element, a light within paths of rays of light $T_0$ and $B_0$ whose main ray of light is a ray of light $L_0$, light within paths of rays of light $T_1$ and $B_1$ whose main ray of light is a ray of light $L_1$ and a light within paths of rays of light $T_2$ and $B_2$ whose main ray of light is a ray of light $L_2$ will be attenuated in intensity in the nearly same amount in a zone 22b which is out of alignment with the center of the lens element. Thus, when the wavelength-selective optical aperture filter 22 is provided in the vicinity of the fly-eye lens 4 at the pupil of the illumination optical system, light components directed toward the liquid crystal panels 10, 13 and 19 located in different positions can be kept uniform.

Also, when the wavelength-selective optical aperture filter 22 has provided therein portions different in transmittance correspondingly to different wavelengths and working as optical apertures, respectively, and which include a light between the lens elements of the fly-eye lenses 3 and 4, it can maintain the uniformity of the illumination light and effectively use the space.

In the liquid crystal projector constructed as above, each of the parts provided along the optical path of the illumination light emitted from the lamp 1 functions as the light travels along the optical paths, as will be described below.

The illumination light emitted from the lamp 1 includes components whose wavelengths correspond to the three primary colors: red, green and blue, respectively. It is guided to the fly-eye lens 3. The lens elements of the fly-eye lens 3 gather and direct the red, green and blue light components upon the wavelength-selective optical aperture filter 22.

Next, the wavelength-selective optical aperture filter 22 allows the red component of the incident light to pass through as it is while allowing the green and blue components not to pass through the zone B but to be incident upon the fly-eye lens 4. The lens elements of the fly-eye lens 4 gather the green and blue components, uniformize the illumination distributions of the light components, and allow the components to be incident upon the PS converter 5.

Next, the PS converter 5 allows the illumination light incident thereupon to pass through while converting the S-polarized light into P-polarized light. Namely, all the illumination light components are incident as P-polarized light upon the main condenser lens 6 which will gather and direct the P-polarized light upon the dichroic mirror 7.

Next, the dichroic mirror 7 reflects and guides the blue component of the illumination light incident thereupon to the mirror 11 while allowing the other primary-color light components, red and green, to pass through and guide them to the dichroic mirror 8.

The mirror 11 reflects and guides the blue light incident thereupon onto the channel condenser lens 12. Then the channel condenser lens 12 gathers and directs the blue light upon the liquid crystal panel 13. The liquid crystal panel 13 will spatially modulate the blue light according to a video signal corresponding to the blue. The blue light thus modulated passes through the liquid crystal panel 13, and is incident upon the cross prism 20 at the incident face 20a.

On the other hand, the dichroic mirror 8 reflects and guides the green one of the green and red components incident thereupon upon the channel condenser lens 9, while allowing the remaining light, namely, the red light, to pass through to the relay lens 14.

The green light incident upon the channel condenser lens 9 is passed to the liquid crystal panel 10 where it will be spatially modulated according to a video signal corresponding to the green. The green light thus spatially modulated is passed through the liquid crystal panel 10 to the incident face 20b of the cross prism 20.

The relay lens 14 allows the red light incident thereupon to pass through to the mirror 15 which will reflect the red light toward the relay lens 16. The relay lens 16 allows the red light incident thereupon to pass through to the mirror 17 which will reflect the incident red light toward the channel condenser lens 18.

The channel condenser lens 18 gathers and directs the red light 25 upon the liquid crystal panel 19 which will spatially modulate the red light according to a video signal corresponding to the red. The red light thus modulated is passed through the liquid crystal panel 19 to the incident face 20c of the cross prism 20.

The cross prism 20 combines the incident blue, green and red light components to produce synthetic light which will go out from the outgoing surface 20d and be projected onto a screen through the projection lens 21.

As above, the liquid crystal projector attenuates the intensity of the light having a specific wavelength by limiting the light having that wavelength by the wavelength-selective optical aperture filter 22, modulates light components having the respective wavelengths separated to three optical paths by the liquid crystal panels for the respective wavelengths, and thus displays an image corresponding to the video signal through the projection lens 21.

For adjusting the white balance of light components projected onto the screen, the liquid crystal projector has to adjust the ratio in illumination among the primary colors. For this adjustment in the illumination optical system, the present invention uses, as means for attenuating the intensity of the one of the primary-color light components which shows the largest illumination, the wavelength-selective optical aperture filter 22 having the zones different in transmittance from each other correspondingly to the wavelengths to limit the light components. That is, the liquid crystal projector can adjust the white balance by the wavelength-selective optical aperture filter 22 to change the aperture diameter for each of the wavelengths corresponding to three primary colors, namely, for each channel and adjust the ratio in intensity attenuation among the primary-color light components.

Since each of the liquid crystal devices such as the liquid crystal panels 10, 13 and 19 has liquid crystal molecules slightly angulated, namely, pre-tilted in relation thereto, as the incident light is tilted from the vertical direction in relation to the panel surface, the light cannot spatially be modulated as desired. For example, even when displaying a dark or black thing, the liquid crystal panels cannot perfectly intercept light components but allows a little light to pass through, resulting in a bright display and lower contrast of the image.

In the liquid crystal projector, since the channel can be attenuated in intensity and limited by the wavelength-selective optical aperture filter 22, the F value can be made large, and since the light components are vertically incident at a reduced angle upon the surfaces of the liquid crystal panels 10, 13 and 19 to cause the light components to be diverged through a reduced angle, the image contrast can be improved.

That is, the liquid crystal projector can adjust the white balance and also improve the image contrast as having been described above.

As above, the present invention uses, in the illumination optical system, the wavelength-selective optical aperture filter 22 formed from spectral filters such as a dichroic filter designed to change the diameter of the optical aperture correspondingly to the wavelength of illumination light. The wavelength-selective optical aperture filter 22 can be set to change the aperture diameter, but in this embodiment, only one of the components having a specific wavelength corresponding to a primary color is selectively allowed to pass through the wavelength-selective optical aperture filter 22 while the light components having wavelengths corresponding to the other primary colors are not allowed to pass through the wavelength-selective optical aperture filter 22. Therefore, the wavelength-selective optical aperture filter 22 can limit the primary-color light components having the specific wavelengths, whereby the illumination light can freely be attenuated in intensity. Since the intensity-attenuated channel has a larger F value, the light components are diverged at a reduced angle and thus a liquid crystal panel as the display device can display an image with an improved contrast.

Since the number of parts used is not larger than in a conventional system using an ND filter for each channel, the liquid crystal projector according to the present invention can be designed less complex and manufactured with less costs.

More specifically, since the wavelength-selective optical aperture filter 22 is formed from a dichroic coating provided on the flat side of the fly-eye lens 4, the liquid crystal projector according to the present invention can be formed, from a number of parts, not larger than that in the conventional system, with less costs, improved adjustability of projected white light at chromaticity points and with an improved image contrast.

Figure 8:
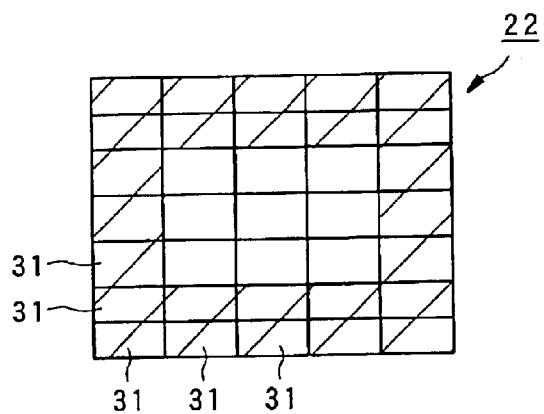
FIG. 8 is a plan view of the wavelength-selective optical aperture filter zoned for approximate correspondence to the elements of the fly-eye lens.

Note that in case the illuminator according to the present invention includes the fly-eye lenses 3 and 4 as shown in FIG. 1, the wavelength-selective optical aperture filter 22 should preferably have smaller zones 31 corresponding to lens elements of the fly-eye lens 4 as shown in FIG. 8. Each of the small zones 31 is shaped approximately to the profile of the lens element.

Note that the grid-like small zone 31 of the wavelength-selective optical aperture filter 22 shown in FIG. 8 corresponds to each element of the fly-eye lens 4, namely, the wavelength-selective optical aperture filter 22 is zoned correspondingly to the profile of each lens element of the fly-eye lens 4. Thus, the wavelength-selective optical aperture filter 22 functions effectively as mentioned above.

By zoning the wavelength-selective optical aperture filter 22 as above, it is possible to further improve the distribution uniformity of the illumination light through the wavelength-selective optical aperture filter 22 and fly-eye lens 4 as will be seen from FIG. 2. Owing to such zoning of the wavelength-selective optical aperture filter 22, the intensity attenuation of a specific channel will not cause the on-screen picture to be colored unevenly.

Also in the illuminator, in case the fly-eye lenses 3 and 4 are used, the above effects can be attained without degradation in uniformity of any projected picture by optically limiting the light through each of the lens elements of the fly-eye lens 4.

Figure 9:
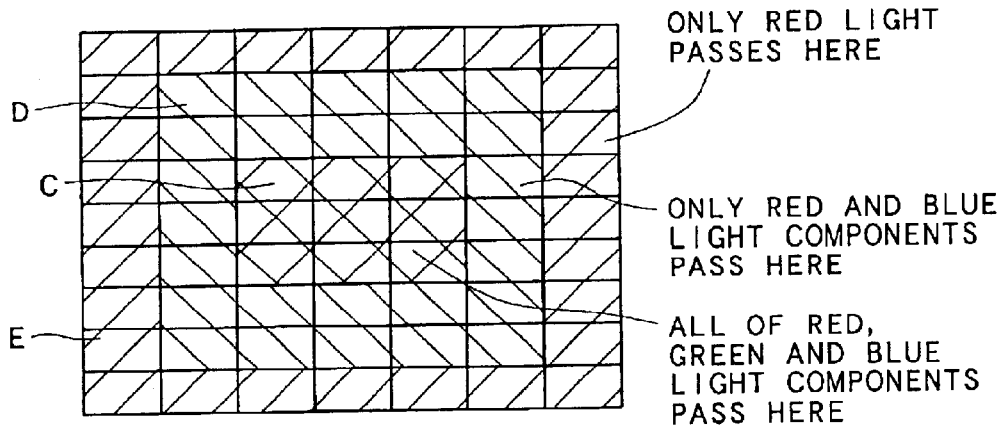
FIG. 9 is a plan view of an example division of the wavelength-selective optical aperture filter into three zones.

The liquid crystal projector according to the present invention has been described concerning the embodiment in which the wavelength-selective optical aperture filter 22 consists of the zones A and B as shown in FIG. 3. However, the number of the zones of the wavelength-selective optical aperture filter 22 is not limited to two as above but may be three as shown in FIG. 9. Accordingly, the diameter of the optical aperture can be adjusted subtly for each channel.

In case a metal halide lamp or high-voltage mercury lamp is used as the lamp 1, for example, the green and blue light components are intenser than the red light as having been described above, and the green light is intensest when the visibility of the light components is taken in consideration.

As shown in FIG. 9, the wavelength-selective optical aperture filter 22 consists of three zones C, D and E. The zone C is positioned nearly in the center of the filter 22, the zone D surrounds the zone C, and further the zone E surrounds the zone D. For example, the wavelength-selective optical aperture filter 22 is so set that the generally central zone C allows all the red, green and blue light components to pass through, the zone D allows only the blue light to pass through, and the zone E allows only the red light to pass through.

The above wavelength-selective optical aperture filter 22 limits the diameter of the optical aperture in three steps correspondingly to the wavelengths. Namely, it provides a smallest optical aperture for the green light to be attenuated most in intensity and a next smallest optical aperture for the blue light to be attenuated in intensity in an amount next to that for the green light, and thus allows the red light which should not be attenuated in intensity to pass through as it is.

Thus, when the metal halide lamp or high-voltage mercury lamp is used as the lamp 1, the wavelength-selective optical aperture filter 22 can adjust the white balance more elaborately by adjusting the intensity-attenuated amount for each of the light components having the three primary colors.

Note that correspondingly to the wavelength characteristic of the lamp 1, the zone D of the wavelength-selective optical aperture filter 22 may of course be set to allow only the red and green light components to pass through.

Figure 10:
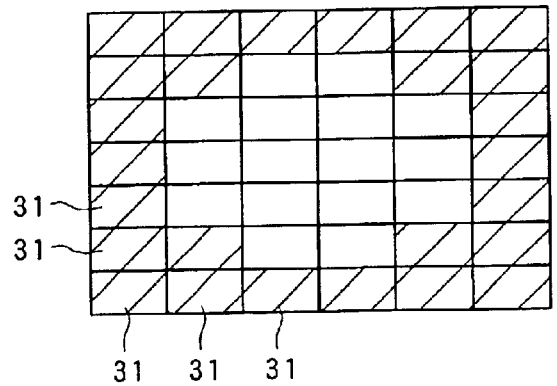
FIG. 10 is a plan view of an example mosaic zoning of the wavelength-selective optical aperture filter.

In the above liquid crystal projector, the zones of the wavelength-selective optical aperture filter 22 may not always be shaped rectangular as shown in FIGS. 3, 8 and 9 but they may be shaped like mosaic as shown in FIG. 10 for example.

Figure 11:
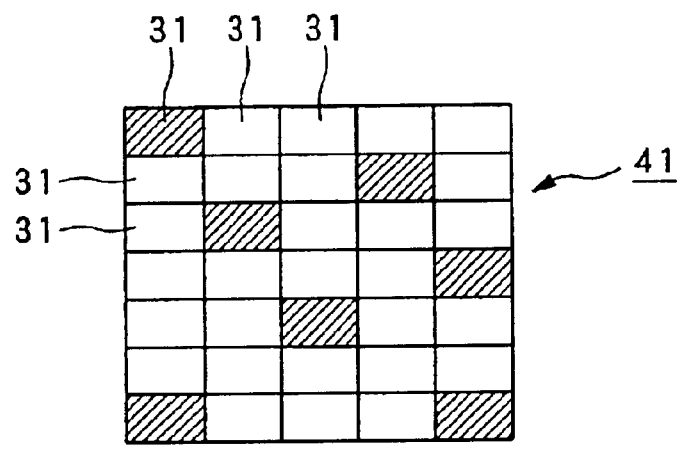
FIG. 11 is a plan view of an example wavelength-selective optical filter provided at random in each sub-zone.

Further, in the above-mentioned liquid crystal projector, the wavelength-selective optical aperture filter 22 may not be regularly divided into such zones as shown in FIGS. 3, 8 and 10 but filter areas may be formed at random like each small zone 31 as shown in FIG. 11 for example.

The filter areas formed at random in each small zone 31 will be described below. It should be noted however that a wavelength-selective optical filter 41 will be taken in the following description instead of the wavelength-selective optical aperture filter 22 since it has a different optical action from the optical aperture when the filter areas are formed at random like each small zone 31.

The wavelength-selective optical filter 41 includes the small zones 31 provided at random correspondingly to the lens elements of the fly-eye lens 4. As having been described above with reference to FIG. 2, the light having passed through one lens element of the fly-eye lens 4 illuminates each part of the liquid crystal panel. Since the fly-eye lens 4 is designed to superpose the light components having passed through the lens elements on one another at the liquid crystal panel to uniformize the illumination distribution, the wavelength-selective optical filter 41 as a whole attenuates the light intensity by cutting off the light having a desired wavelength through each lens element.

The wavelength-selective optical filter 41 can easily make a fine adjustment of the transmittance of the light having a desired wavelength through adjustment of the number of the small zones 31 in which the filter areas are formed.

By providing the wavelength-selective optical filter 41 in the above-mentioned liquid crystal projector, it is possible to easily adjust the white balance as above and make it unnecessary to provide any ND filter for each channel.

Note that similar to the wavelength-selective optical aperture filter 22, the wavelength-selective optical filter 41 is formed from a dichroic coating provided on the flat side, or at the periphery, of the fly-eye lens 4.

Note that the aforementioned fly-eye lenses 3 and 4 are optical means for providing uniform illumination and the light components having passed through the fly-eye lens 4 are generally parallel to each other.

Therefore, in an optical system in which the uniformity of the illumination light is not important, a lamp which emits generally parallel light may be used instead of making the light from the lamp 1 uniform and generally parallel to each other by the fly-eye lenses 3 and 4. The existence of the fly-eye lenses 3 and 4 is not critical to the implementation of the present invention.

In the illuminator using the liquid crystal panels for polarized light components, the PS converter 5 improves the brightness of the light by equalizing the polarizing directions of the light components which illuminate the liquid crystal panel.

Therefore, in an optical system in which the brightness of the light is not important, the PS converter 5 may not be used and thus the existence of the PS converter 5 is not critical to the implementation of the present invention.

Figure 12:
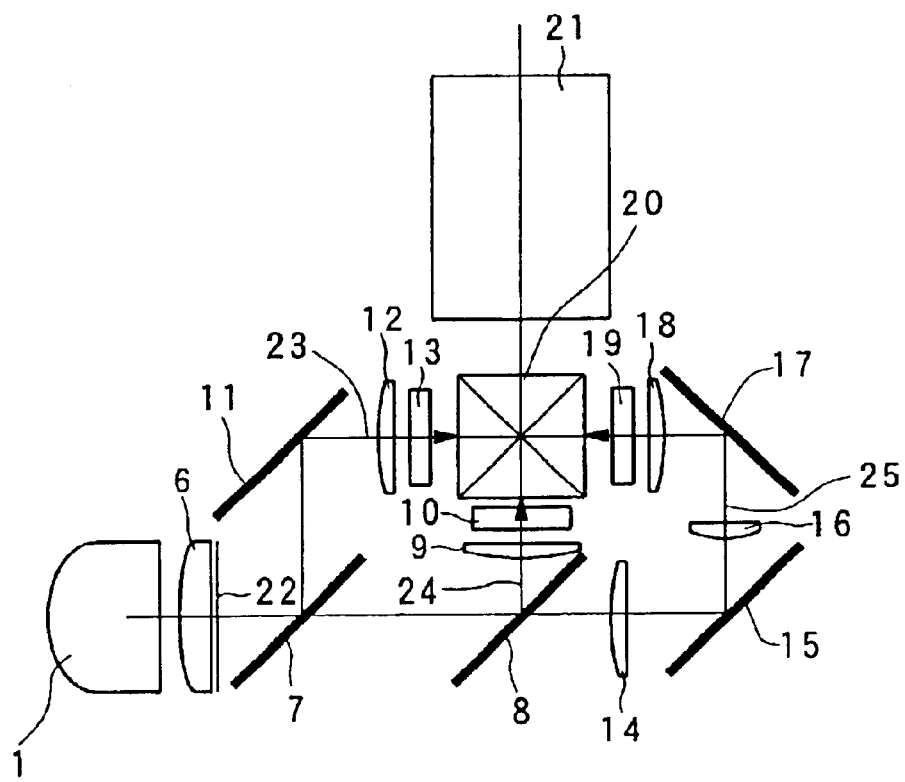
FIG. 12 shows the construction of a variant of the liquid crystal projector according to the present invention in which the fly-eye lenses and PS converter are omitted and a wavelength-selective optical aperture filter is formed on the main side of the main condenser lens.

Therefore, according to the present invention, the optical system including the lamp 1 in the illuminator 2, fly-eye lenses 3 and 4 and the PS converter 5 as shown in FIG. 1 may be replaced with a lamp which emits generally parallel light. FIG. 12 shows a variant of the liquid crystal projector according to the present invention in which the fly-eye lenses 3 and 4 and the PS converter 5 in FIG. 1 are not provided but the wavelength-selective optical aperture filter 22 is formed on the main side of the main condenser lens 6.

That is, in the variant of the liquid crystal projector shown in FIG. 12, the illuminator 2 is composed of the lamp 1 and the main condenser lens 6 having the wavelength-selective optical aperture filter 22 formed on the main side thereof.

The liquid crystal projector constructed as shown in FIG. 12 will further be described below concerning the function of each of the parts thereof provided along the optical paths of the illumination light emitted from the lamp 1.

The illumination light emitted from the lamp 1 includes components whose wavelengths correspond to the three primary colors: red, green and blue, respectively. It is guided to the main condenser lens 6 where it will be gathered and directed upon the wavelength-selective optical aperture filter 22 provided on the main side of the main condenser lens 6.

Next, the red component of the light incident upon the wavelength-selective optical aperture filter 22 passes through the latter as it is while the green and blue components pass through only the zone A but not through the zone B. The light thus limited by the filter 22 is incident upon the dichroic mirror 7.

Next, the blue component of the illumination light incident upon the dichroic mirror 7 is reflected by the latter toward the mirror 11 while the other primary-color components, red and green, are passed through the dichroic mirror 7 to the dichroic mirror 8.

The blue light incident upon the mirror 11 is reflected by the latter toward the channel condenser lens 12. It is gathered and directed by the channel condenser lens 12 upon the liquid crystal panel 13 where it will be spatially modulated according to a video signal corresponding to the blue. The blue light thus spatially modulated is passed through the liquid crystal panel 13 to the incident face 20a of the cross prism 20.

On the other hand, the green one of the green and red light components incident upon the dichroic mirror 8 is reflected by the latter toward the channel condenser lens 9 while the remaining light having the other primary color, that is, the red light, is allowed by the dichroic mirror 8 to pass through the latter and incident upon the rely lens 14.

The green light incident upon the channel condenser lens 9 is passed to the liquid crystal panel 10 where it will be spatially modulated according to a video signal corresponding to the green. The green light thus spatially modulated is passed through the liquid crystal panel 10 to the incident face 20b of the cross prism 20.

The red light 25 incident upon the relay lens 14 passes through the latter and is reflected by the mirror 15 toward the relay lens 16. The red light 25 thus incident upon the relay lens 16 passes through the latter and is reflected by the mirror 17 toward the channel condenser lens 18.

The red light 25 thus incident upon the channel condenser lens 18 is gathered and directed upon the liquid crystal panel 19 where it will be spatially modulated according to a video signal corresponding to the red. The red light 25 thus spatially modulated is passed through the liquid crystal panel 19 and incident upon the cross prism 20 at the incident face 20c.

The blue, green and red components thus incident upon the cross prism 20 are combined together by the latter to produce synthetic light which will go out from the cross prism 20 at the outgoing face 20d. The synthetic light is projected onto the screen through the projection lens 21.

As having been described in the foregoing, the liquid crystal projector shown in FIG. 12 can attain the same effect as in the aforementioned embodiments by limiting the specific wavelengths by the wavelength-selective optical aperture filter 22 to attenuate the intensity of the light components having the wavelengths.

Figure 13:
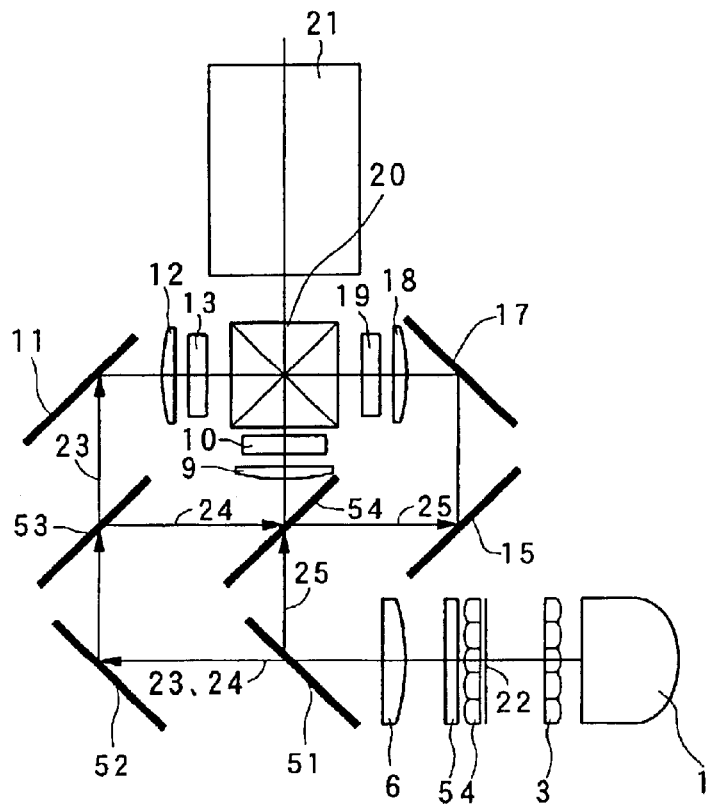
FIG. 13 shows the construction of another variant of the liquid crystal projector according to the present invention in which the optical path lengths are equalized using mirrors in place of the relay lens.

The liquid crystal projector shown in FIG. 1 includes the relay lenses 14 and 16 to equalize the optical path lengths. However, the optical system can be constructed to equalize the optical path lengths without use of the relay lenses. FIG. 13 shows a variant of the embodiment, in which mirrors are used instead of the relay lenses to equalize the optical path lengths. Since the use of the mirrors will lead to a large apparatus than that which uses the relay lenses, however, the relay lenses should preferably be used in case the apparatus should be small.

The liquid crystal projector shown in FIG. 13 includes a dichroic mirror 51, mirror 52, dichroic mirror 53 and a mirror 54 in addition to the dichroic mirrors 7 and 8 included in the liquid crystal projector shown in FIG. 1.

The dichroic mirror 51 functions to split the incident illumination light having come via the fly-eye lens 3, wavelength-selective optical aperture filter 22, fly-eye lens 4, PS converter 5 and the main condenser lens 6 into a red light 25 whose wavelength corresponds to the red and light components whose wavelengths correspond to the other primary colors.

The mirror 52 reflects, toward the dichroic mirror 53, the light components having the wavelengths corresponding to the other primary colors and split by the dichroic mirror 51 from the illumination light.

The dichroic mirror 53 functions to split the light components having the wavelengths corresponding to the other primary colors reflected from the mirror 52 into a blue light 23 having the wavelength corresponding to the blue and a light having another color, that is, a green light 24 having the wavelength corresponding to the green.

The mirror 54 reflects the blue light 23 split by the dichroic mirror 53 toward the channel condenser lens 9 while reflecting, toward the mirror 15, the red light 25 split by the dichroic mirror 51 from the illumination light.

The liquid crystal projector constructed as shown in FIG. 13 will further be described below concerning the function of each of the parts thereof provided along the optical paths of the illumination light emitted from the lamp 1.

The illumination light emitted from the lamp 1 includes components whose wavelengths correspond to the three primary colors: red, green and blue, respectively. It is guided to the main condenser lens 6 which will gather and direct it upon the wavelength-selective optical aperture filter 22 provided on the main side of the main condenser lens 6.

Next, the red component of the light incident upon the wavelength-selective optical aperture filter 22 passes through the latter as it is while the green and blue components thereof cannot pass through the zone B. The light thus limited by the filter 22 is incident upon the dichroic mirror 51.

Next, the red component of the illumination light incident upon the dichroic mirror 51 is reflected by the latter toward the mirror 54 while other light components, that is, the red and green components, are passed through the dichroic mirror 51 to the mirror 52.

The blue and green components incident upon the mirror 52 are reflected by the latter toward the dichroic mirror 53. The green one of the blue and green components incident upon the dichroic mirror 53 is reflected by the latter toward the mirror 54 while the other component, namely, the blue component, passes through the dichroic mirror 53 and is guided to the mirror 11.

The blue light incident upon the mirror 11 is reflected by the latter toward the channel condenser lens 12. It is gathered and directed by the channel condenser lens 12 upon the liquid crystal panel 13 where it will be spatially modulated according to a video signal corresponding to the blue. The blue light thus spatially modulated is passed through the liquid crystal panel 13 to the incident face 20a of the cross prism 20.

On the other band, the green light incident upon the mirror 54 is reflected by the latter toward the channel condenser lens 9 toward the liquid crystal panel 10. The green light thus incident upon the liquid crystal pane 9 will be spatially modulated according to a video signal corresponding to the green. The green light thus spatially modulated is passed through the liquid crystal panel 10 to the incident face 20b of the cross prism 20.

The red light incident upon the mirror 54 is reflected by the mirrors 54, 15 and 17 in this order toward the channel condenser lens 18.

The red light 25 thus incident upon the channel condenser lens 18 is passed to the liquid crystal panel 19 where it will be spatially modulated according to a video signal corresponding to the red. The red light thus spatially modulated is passed through the liquid crystal panel 19 to the incident face 20c of the cross prism 20.

The blue, green and red light components thus incident upon the cross prism 20 are combined together by the cross prism 20 to produce synthetic light which will go out from the outgoing face 20d and be projected onto the screen through the projection lens 21.

As having been described in the foregoing, the liquid crystal projector shown in FIG. 13 can attain the same effect as in the aforementioned embodiments by limiting the specific wavelengths by the wavelength-selective optical aperture filter 22 to attenuate the intensity of the light components having the wavelengths.

Figure 14:
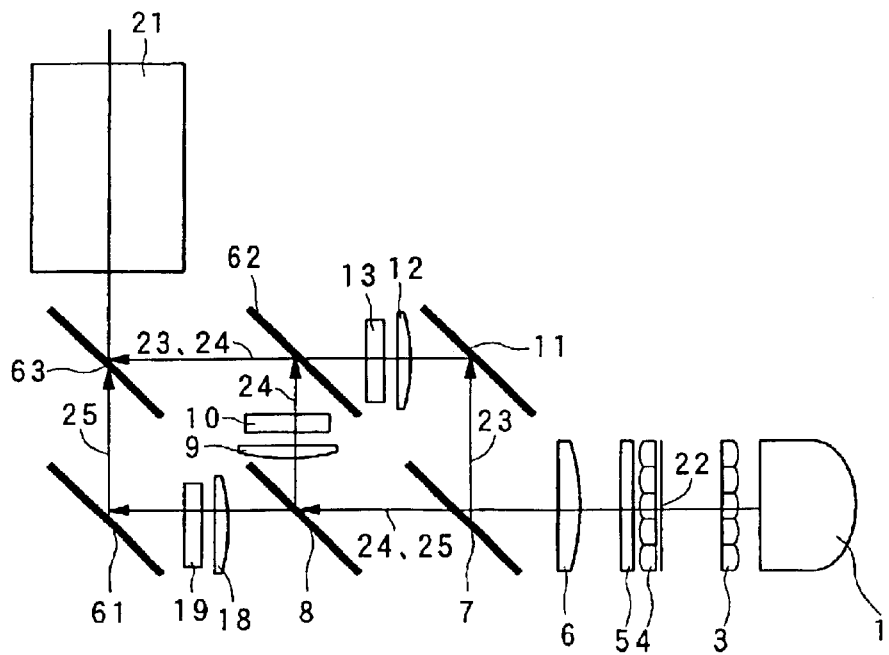
FIG. 14 shows the construction of a still another variant of the liquid crystal projector according to the present invention in which light components having primary colors are combined together using mirrors in lieu of the cross prism.

In the liquid crystal projector shown in FIG. 1, the cross prism 20 is used to synthesize primary-color light. However, the primary-color light can be synthesized by the use of mirrors or the like without using the cross prism 20. FIG. 14 shows a variant of the liquid crystal projector according to the present invention, in which mirrors are used instead of the cross prism to synthesize the primary-color light.

The liquid crystal projector shown in FIG. 14 includes a mirror 61 and dichroic mirrors 62 and 63 in place of the mirrors 15 and 17 and the cross prism 20 included in the liquid crystal projector shown in FIG. 1.

The mirror 61 reflects the red light 25 spatially modulated by the liquid crystal panel 19 toward the dichroic mirror 63.

The dichroic mirror 62 reflects the green light 24 spatially modulated by the liquid crystal panel 10 toward the dichroic mirror 63 and allows the blue light 23 spatially modulated by the liquid crystal panel 13 to pass through to the dichroic mirror 63.

The dichroic mirror 63 allows the red light 25 reflected from the mirror 61 to pass through to the projection lens 21 while reflecting, toward the projection lens 21, the green light 24 reflected from the dichroic mirror 62 and blue light 23 having passed through the dichroic mirror 62.

The liquid crystal projector constructed as shown in FIG. 14 will further be described concerning the function of each of the parts thereof provided along the light paths of the illumination light emitted from the lamp 1.

The illumination light emitted from the lamp 1 includes components whose wavelengths correspond to three primary colors: red, green and blue, respectively, and it is guided to the fly-eye lens 3. The illumination light is gathered and directed by the lens elements of the fly-eye lens 3 upon the wavelength-selective optical aperture filter 22.

Next, the illumination light thus incident upon the wavelength-selective optical aperture filter 22 has the red component thereof allowed to pass through but the green and blue components not allowed to pass through the zone B but limited by the wavelength-selective optical aperture filter 22. The illumination light is then incident upon the fly-eye lens 4. It is gathered, uniformized in illumination distribution and directed by the lens elements of the fly-eye lens 4 upon the PS converter 5.

Next, the illumination light thus incident upon the PS converter 5 has the P-polarized component thereof allowed to pass through and the S-polarized component thereof converted into P-polarized light. Namely, the illumination light is incident wholly as the P-polarized light upon the main condenser lens 6 which will gather and direct the light upon the dichroic mirror 7.

Next, the illumination light thus incident upon the dichroic mirror 7 has the blue component thereof reflected toward the mirror 11 and the other primary-color components thereof, that is, the red and green components, allowed to pass through to the dichroic mirror 8.

The blue light thus incident upon the mirror 11 is reflected by the mirror 11 toward the channel condenser lens 12. The blue light is thus incident upon the channel condenser lens 12 and gathered and directed by the latter upon the liquid crystal panel 13 where it will be spatially modulated according to a video signal corresponding to the blue. The blue light thus spatially modulated is passed through the liquid crystal panel 13 to the dichroic mirror 62. The blue light thus incident upon the dichroic mirror 62 is passed through the dichroic mirror 62, and guided to the dichroic mirror 63.

On the other hand, the green one of the green and red light components incident upon the dichroic mirror 8 is reflected by the latter toward the channel condenser lens 9, while the other primary-color one, that is, the red light, is passed through the dichroic mirror 8 to the channel condenser lens 18.

The green light incident upon the channel condenser lens 9 is passed to the liquid crystal panel 10 where it will be spatially modulated according to a video signal corresponding to the green. The green light thus spatially modulated passes through the liquid crystal panel 10, and is incident upon the dichroic mirror 62 which will reflect the green light toward the dichroic mirror 63.

Also, the red light incident upon the channel condenser lens 18 is passed to the liquid crystal panel 19 where it will spatially be modulated according to a video signal corresponding to the red. The red light thus spatially modulated is passed through the liquid crystal panel 19 to the mirror 61 which will reflect the incident red light toward the dichroic mirror 63.

The blue and green light components incident upon the dichroic mirror 63 are reflected by the latter toward the projection lens 21. The red light passes through the dichroic mirror 63, and is incident upon the projection lens 21. The blue, green and red light components are thus combined together by the dichroic mirror 63 to produce synthetic light which will be projected onto the screen through the projection lens 21.

As above, the liquid crystal projector shown in FIG. 14 can attain the same effect as in the foregoing embodiments of the present invention by limiting the specific wavelengths by the wavelength-selective optical aperture filter 22 to attenuate the intensity of the light components having the wavelengths.

Figure 15:
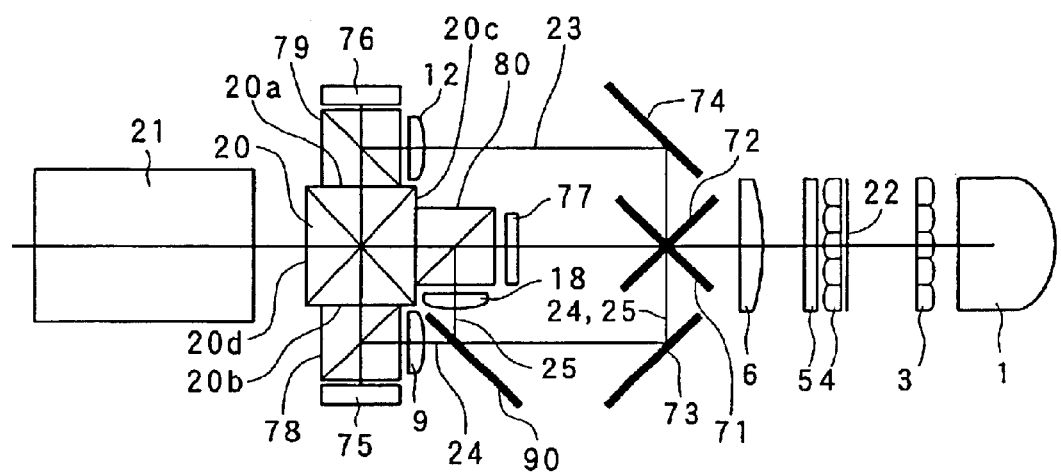
FIG. 15 shows the construction of a yet another variant of the liquid crystal projector according to the present invention in which there is provided an optical system using a reflecting liquid crystal panel.

In the foregoing, the liquid crystal projectors according to the present invention have been described concerning the optical system using the transmission type liquid crystal panels. However, the present invention is not limited to such embodiments but may include an optical system using reflection type liquid crystal panels. FIG. 15 shows a variant of the liquid crystal projector using reflection type liquid crystal panels 75, 76 and 77 and which can also attain the same effect as in the aforementioned embodiments.

The liquid crystal projector shown in FIG. 15 includes an illuminator 2, dichroic mirrors 71 and 72, mirrors 73 and 74, dichroic mirror 90, channel condenser lenses 9, 12 and 18, reflection type liquid crystal panels 75, 76 and 77, polarizing beam splitters (PBS) 78, 79 and 80, cross prism 20, and a projection lens 21. It should be noted that the same parts as in the liquid crystal projector shown in FIG. 1 are indicated with the same references as in FIG. 1 and will not be described any more in the following description.

The dichroic mirror 71 functions to split the illumination light incident thereupon through the fly-eye lens 3, wavelength-selective optical aperture filter 22, fly-eye lens 4, PS converter 5 and main condenser lens 6 into a blue light 23 having a wavelength corresponding to the blue and other light components having wavelengths corresponding to the other primary colors.

The dichroic mirror 72 splits the illumination light incident thereupon through the fly-eye lens 3, wavelength-selective optical aperture filter 22, fly-eye lens 4, PS converter 5 and main condenser lens 6 into green and red light components 24 and 25 whose wavelengths correspond to the red and green, respectively.

The above dichroic mirrors 71 and 72 are disposed orthogonally to each other. More specifically, these dichroic mirrors 71 and 72 reflect the blue component of the incident illumination light toward the mirror 74 while reflecting the green and red light components toward the mirror 73.

The mirror 73 reflects the green and red light components reflected from the dichroic mirror 72 toward the dichroic mirror 90. The mirror 74 reflect, toward the channel condenser lens 12, the blue component reflected from the dichroic mirror 8.

The dichroic mirror 90 is provided to split the green and red light components reflected from the mirror 73 into green light 24 whose wavelength corresponds to the green wavelength and red light 25 whose wavelength corresponds to the red.

The reflection type liquid crystal panel 75 spatially modulates the green light 24 incident thereupon through the channel condenser lens 9 and PBS 78 according to a video signal corresponding to the green, and then reflects the spatially modulated green light 24.

The reflection type liquid crystal panel 76 spatially modulates the blue light 23 incident thereupon through the channel condenser lens 12 and PBS 79 according to a video signal corresponding to the blue, and then reflects the spatially modulated blue light 23.

The reflection type liquid crystal panel 77 spatially modulates the red light 25 incident thereupon through the channel condenser lens 18 and PBS 80 according to a video signal corresponding to the red, and then reflects the spatially modulated red light 25.

The PBS (polarizing beam splitter) 78 splits the green light from the illumination light by reflecting it or allowing it to pass through according to the polarized green component. For example, the PBS 78 allows P-polarized light to pass through while turning the traveling direction of S-polarized light by 90 degrees by reflecting the S-polarized light at a reflecting surface tilted 45 degrees in relation to the optical path of the illumination light.

The PBS (polarizing beam splitter) 79 splits the blue light from the illumination light by reflecting it or allowing it to pass through according to the polarized green component. For example, the PBS 79 allows P-polarized light to pass through while turning the traveling direction of S-polarized light by 90 degrees by reflecting the S-polarized light at a reflecting surface tilted 45 degrees in relation to the optical path of the illumination light.

The PBS (polarizing beam splitter) 80 splits the red light from the illumination light by reflecting it or allowing it to pass through according to the polarized green component. For example, the PBS 80 allows P-polarized light to pass through while turning the traveling direction of S-polarized light by 90 degrees by reflecting the S-polarized light at a reflecting surface tilted 45 degrees in relation to the optical path of the illumination light.

Next, the reflection type liquid crystal projector constructed as shown in FIG. 15 will be described concerning the function of each of the parts provided along the optical path of the illumination light emitted from the lamp 1.

The illumination light emitted from the lamp 1 includes components whose wavelengths correspond to the three primary colors: red, green and blue, respectively. It is guided to the fly-eye lens 3, gathered and directed by the lens elements of the fly-eye lens 3 upon the wavelength-selective optical aperture filter 22.

Next, the light thus incident upon the wavelength-selective optical aperture filter 22 has the red component thereof allowed to pass as it is through the wavelength-selective optical aperture filter 22 and the green and blue components not allowed to pass through the zone B of the filter 22 but limited by the filter 22. The illumination light is then incident upon the fly-eye lens 4. It is gathered, uniformized in illumination distribution and directed by the lens elements of the fly-eye lens 4 upon the PS converter 5.

Next, the illumination light thus incident upon the PS converter 5 has the P-polarized component thereof allowed to pass through the PS converter 5 and the S-polarized light converted into P-polarized light. Thus, the illumination light is passed wholly as the P-polarized light to the main condenser lens 6. It is gathered and directed by the main condenser lens 6 upon the dichroic mirrors 71 and 72.

Next, the illumination light thus incident upon the dichroic mirrors 71 and 72 will have the blue component thereof reflected by the dichroic mirror 73 toward the mirror 74 and the green and red components reflected toward the mirror 73.

The blue light incident upon the mirror 74 is reflected by the latter toward the channel condenser lens 12 which will gather and direct it upon the PBS 79. The blue light is reflected by the PBS 79 toward the reflection type liquid crystal panel 6. The liquid crystal panel 6 will spatially modulate the incident blue light according to a video signal corresponding to the blue, and reflect the blue light thus spatially modulated toward the PBS 79 which will allow the blue light to pass through. The blue light is incident upon the cross prism 20 at the incident face 20a.

On the other hand, the green and red light components of the illumination light incident upon the mirror 73 are reflected by the latter toward the dichroic mirror 90. The red light is reflected by the dichroic mirror 90 toward the channel condenser lens 18 while the green light is passed through the dichroic mirror 90 to the channel condenser lens 9.

The green light thus incident upon the channel condenser lens 9 is gathered and directed by the latter upon the PBS 78 by which it will be reflected toward the reflection type liquid crystal panel 75. The reflection type liquid crystal panel 75 spatially modulates the incident green light according to a video signal corresponding to the green, and then reflects it toward the PBS 78. The green light is passed through the PBS 78 to the incident dace 20b of the cross prism 20.

Also, the red light incident upon the channel condenser lens 18 is gathered and directed by the latter upon the PBS 80 by which it will be reflected toward the reflection type liquid crystal panel 77. The reflection type liquid crystal panel 77 spatially modulates the incident red light according to a video signal corresponding to the red, and then reflects it toward the PBS 80. The red light is passed through the PBS 80 to the incident face 20c of the cross prism 20.

The blue, green and red light components of the illumination light, incident upon the cross prism 20, are combined together to produce synthetic light which will got out from the outgoing face 20d of the cross prism 20 and projected onto the screen through the projection lens 21.

As above, the reflection type liquid crystal projector shown in FIG. 15 can attain the same effect as in the aforementioned embodiments by limiting the specific wavelengths by the wavelength-selective optical aperture filter 22 to attenuate the intensity of the light components having the wavelengths.

Further, according to the present invention, there may be used, as the light bulb, a device to modulate the light emitted from a light source, such as a spatial light modulator or the like using a matrix of micro mirrors such as a digital micro mirror device (DMD), in place of each of the aforementioned reflection type liquid crystal panels.

Also, according to the present invention, the wavelength-selective optical aperture filter 22 is not provided in any limited position but may be positioned in any position on the optical axis of the illumination light emitted from the lamp 1 and where the optical restriction is made earlier than the color separation, that is, in a position near the fly-eye lens 4. The disposition of the filter 22 in such a position will attain the aforementioned effect.

Therefore, in the liquid crystal projector being an example in which the fly-eye lens is used as shown in FIG. 1, the wavelength-selective optical aperture filter 22 may be provided in any position on the optical axis of the illumination light and near the fly-eye lens 4 and PS converter 5 to attain the aforementioned effect.

In the aforementioned embodiments, the wavelength-selective optical aperture filter is formed from a dichroic coating provided on the fly-eye lens or main condenser lens. According to the present invention, however, it is not always necessary to provide such a dichroic coating in the optical system but in case an increased number of parts will not be any problem, an optical element such as a flat glass having a filter coated thereon may be provided as a separate member in the aforementioned predetermined position, which will also be able to attain the same effect as having previously been described.

Also in this case, only one part is additionally provided for attaining the above effect. Namely, since the number of parts is not larger than in the conventional system in which the ND filter is provided for each channel, the liquid crystal projector according to the present invention can be manufactured inexpensively without being complicated in construction.

For the improved contrast as one of the effects of the present invention, the coating of the wavelength-selective optical aperture filter may not always be provided on the surface of the fly-eye lens but may be provided on the front or rear side of the PS converter 5, front or rear side of the main condenser lens 6 or the like, for example.

Note that the present invention is not limited to the aforementioned embodiments but can be modified appropriately without departing from the scope and spirit thereof.

INDUSTRIAL APPLICABILITY

The illuminator according to the present invention is to emit trichromatic light. It is composed of a light source which emits the trichromatic light, and a wavelength-selective optical aperture filter provided at the side of the light source from which the trichromatic light goes out and which attenuates the intensity of the trichromatic light.

The illuminator constructed as above according to the present invention can use a wavelength-selective optical aperture filter formed from a spectral filter, such as a dichroic filter, designed to have the optical aperture diameter changed correspondingly to the wavelength of the illumination light. Thus, it can freely attenuate the intensity of a light having a specific primary color by limiting the light.

The projector type image display apparatus according to the present invention includes an illuminator composed of a light source which emits light including components having three primary colors, and a wavelength-selective optical aperture filter provided at the side of the light source from which the light components having three primary colors go out and which attenuates the intensity of the primary-color light components, means for selecting the intensity-attenuated light components having the three primary colors and splitting them into the primary-color light components according to their wavelengths, three image display panels which modulate the outgoing primary-color light components separated by the color separation means from the illumination light, means for combining together the outgoing primary-color light components modulated by the image display panels, respectively, and a projection lens which receives the outgoing light from the color synthesis means and projecting it onto a screen.

In the projector type image display apparatus constructed as above, the illuminator includes the wavelength-selective optical aperture filter formed from a spectral filter, such as a dichroic filter, designed to have the optical aperture diameter changed correspondingly to the wavelength of the illumination light. Thus, it can freely attenuate the intensity of a light of a specific primary color by limiting the light. Also, in case a liquid crystal panel is used as the display device, an image can be displayed with an improved contrast.

Also, since the number of parts is not larger than in the conventional system in which the ND filter is provided for each channel, the projector type image display apparatus according to the present invention can be manufactured inexpensively without being complicated in construction.

Therefore, the present invention can provide an illuminator and projector type image display apparatus, simply constructed and capable of adjusting the white chromaticity of a projected light and displaying an image with an improved contrast.

What is claimed is:

1. An illuminator which emits trichromatic light including components whose wavelengths correspond to three primary colors, respectively, the apparatus comprising:
   a light source to emit the trichromatic light; and
   a pair of fly-eye lenses formed from a plurality of lens elements, being provided at the side of the light source from which the trichromatic light goes out, and which separates the trichromatic light emitted from the light source into primary-color light components and allows the separated primary-color light components to pass through, thereby uniformizing the trichromatic light output; and
   a wavelength-selective optical aperture filter provided in the neighborhood of one of the pair of fly-eye lenses that is farther from the light source and which consists of zones working as predetermined optical apertures, of which one selectively attenuates or shields a component of the trichromatic light, whose wavelength corresponds to at least one of the three primary colors, while the other zones allow the light components whose wavelengths correspond to the other primary colors to pass through.

2. The apparatus as set forth in claim 1, wherein the zones of the wavelength-selective optical aperture filter correspond to the component of the trichromatic light, having a wavelength corresponding to the red, green or blue of the three primary colors.

3. The apparatus as set forth in claim 1, further comprising the wavelength-selective optical aperture filter being provided adjacent to one of the pair of fly-eye lenses that is farther from the light source.

4. The apparatus as set forth in claim 3, wherein:
   one of the main surfaces of the pair of fly-eye lenses that is farther from the light source is formed flat; and
   the wavelength-selective optical aperture filter is formed on the flat surface of the fly-eye lens farther from the light source.

5. The apparatus as set forth in claim 3, wherein the wavelength-selective optical aperture filter has the zones formed correspondingly to the lens elements of the pair of fly-eye lenses.

6. The apparatus as set forth in claim 5, wherein the wavelength-selective optical aperture filter has the zones formed correspondingly to the light components whose wavelengths correspond to the three primary colors: red, green and blue, respectively.

7. The apparatus as set forth in claim 1, wherein:
   the light source is a metal halide lamp or ultra-high voltage mercury lamp; and
   the zones of the wavelength-selective optical aperture filter attenuate or shield the light components whose wavelengths correspond to the green and/or blue.

8. An illuminator which emits trichromatic light including components whose wavelengths correspond to three primary colors, respectively, the apparatus comprising:
   a light source to emit the trichromatic light;
   a pair of fly-eye lenses each formed from a plurality of elements and which separates the trichromatic light emitted from the light source into primary-color light components and allows the separated primary-color light components to pass through the plurality of lens elements, thereby uniformizing the trichromatic light output; and
   a wavelength-selective optical aperture filter provided adjacent to one of the fly-eye lenses that is farther from the light source and which consists of zones working as predetermined optical apertures, of which one selectively attenuates or shields a component of the trichromatic light, whose wavelength corresponds to at least one of the three primary colors, while the other zones allow the light components whose wavelengths correspond to the other primary colors to pass through.

9. The apparatus as set forth in claim 8, wherein the wavelength-selective optical aperture filter has the zones formed at random correspondingly to the lens elements of the fly-eye lenses.

10. The apparatus as set forth in claim 8, wherein:
    one of the main surfaces of the pair of fly-eye lenses that is farther from the light source is formed flat; and
    the wavelength-selective optical aperture filter is formed on the flat surface of the fly-eye lens that is farther from the light source.

11. The apparatus as set forth in claim 8, wherein the wavelength-selective optical aperture filter has the zones formed correspondingly to the lens elements of the pair of fly-eye lenses.

12. The apparatus as set forth in claim 8, wherein:
    the light source is a metal halide lamp or ultra-high voltage mercury lamp; and
    the zones of the wavelength-selective optical aperture filter attenuate or shield the light components whose wavelengths correspond to the green and/or blue.

13. A projector type image display apparatus comprising:
    an illuminator including:
       a light source to emit trichromatic light; and
       a wavelength-selective optical aperture filter provided at the side of the light source from which the trichromatic light goes out and which consists of zones working as predetermined optical apertures, of which one selectively attenuates or shields a component of the trichromatic light, whose wavelength corresponds to at least one of the three primary colors, while the other zones allow the light components whose wavelengths correspond to the other primary colors to pass through; and
    a color separation means for separating the trichromatic light output from the wavelength-selective optical aperture filter into components whose wavelengths correspond to the three primary colors, respectively;
    three image display panels to modulate, according to a video signal, the light components separated by the color separation means and whose wavelengths correspond to the three primary colors, respectively;
    a color synthesis means for combining together the light components modulated by the three image display panels and whose wavelengths correspond to the three primary colors, respectively, to produce synthetic light; and
    a projection lens to project the synthetic light from the color synthesis means onto a screen.

14. The apparatus as set forth in claim 13, wherein the zones of the wavelength-selective optical aperture filter correspond to the component of the trichromatic light, having a wavelength corresponding to the red, green or blue of the three primary colors.

15. The apparatus as set forth in claim 13, further comprising a pair of fly-eye lenses formed from a plurality of lens element, being provided along the outgoing direction the trichromatic light from the light source, and which separates the trichromatic light emitted from the light source into primary-color light components and allows the separated primary-color light components to pass through the plurality of lens elements, thereby uniformizing the trichromatic light output;

the wavelength-selective optical aperture filter being provided adjacent to one of the pair of fly-eye lenses that is farther from the light source.

16. The apparatus as set forth in claim 15, wherein:

one of the main surfaces of the pair of fly-eye lenses that is farther from the light source is formed flat; and the wavelength-selective optical aperture filter is formed on the flat surface of the fly-eye lens farther from the light source.

17. The apparatus as set forth in claim 15, wherein the wavelength-selective optical aperture filter has the zones formed correspondingly to the lens elements of the pair of fly-eye lenses.

18. The apparatus as set forth in claim 13, wherein the wavelength-selective optical aperture filter has the zones formed correspondingly to the light components whose wavelengths correspond to the three primary colors: red, green and blue, respectively.

19. The apparatus as set forth in claim 13, wherein:

the light source is a metal halide lamp or ultra-high voltage mercury lamp; and the zones of the wavelength-selective optical aperture filter attenuate or shield the light components whose wavelengths correspond to the green and/or blue.

20. The apparatus as set forth in claim 13, wherein the image display panels are liquid crystal panels.

21. A projector type image display apparatus comprising:

an illuminator including:

a light source to emit trichromatic light;

a pair of fly-eye lenses each formed from a plurality of lens elements and which separates the trichromatic light emitted from the light source into primary-color light components and allows the separated primary-color light components to pass through, thereby uniformizing the trichromatic light output; and a wavelength-selective optical aperture filter provided adjacent to one of the fly-eye lenses that is farther from the light source and which consists of zones working as predetermined optical apertures, of which one selectively attenuates or shields a component of the trichromatic light, whose wavelength corresponds to at least one of the three primary colors, while the other zones allow the light components whose wavelengths correspond to the other primary colors to pass through the plurality of lens elements; and means for splitting the trichromatic light output from the wavelength-selective optical aperture filter into components whose wavelengths correspond to the three primary colors, respectively;

three image display panels to modulate, according to a video signal, the light components separated by the color separation means from the illumination light and whose wavelengths correspond to the three primary colors, respectively;

a color synthesis means for combining together the light components modulated by the three image display panels and whose wavelengths correspond to the three primary colors, respectively, to produce synthetic light; and a projection lens to project the synthetic light from the color synthesis means onto a screen.

22. The apparatus as set forth in claim 21, wherein the wavelength-selective optical aperture filter has the zones formed at random correspondingly to the lens elements of the fly-eye lenses.

23. The apparatus as set forth in claim 21, wherein:

one of the main surfaces of the pair of fly-eye lenses that is farther from the light source is formed flat; and the wavelength-selective optical aperture filter is formed on the flat surface of the fly-eye lens farther from the light source.

24. The apparatus as set forth in claim 21, wherein the wavelength-selective optical aperture filter has the zones formed correspondingly to the light components whose wavelengths correspond to the three primary colors: red, green and blue, respectively.

25. The apparatus as set forth in claim 22, wherein:

the light source is a metal halide lamp or ultra-high voltage mercury lamp; and the zones of the wavelength-selective optical aperture filter attenuate or shield the light components whose wavelengths correspond to the green and/or blue.

* * * * *